Oct. 4, 1966    V. A. GILL    3,276,474
VALVED COUPLING
Filed June 5, 1963    4 Sheets-Sheet 1
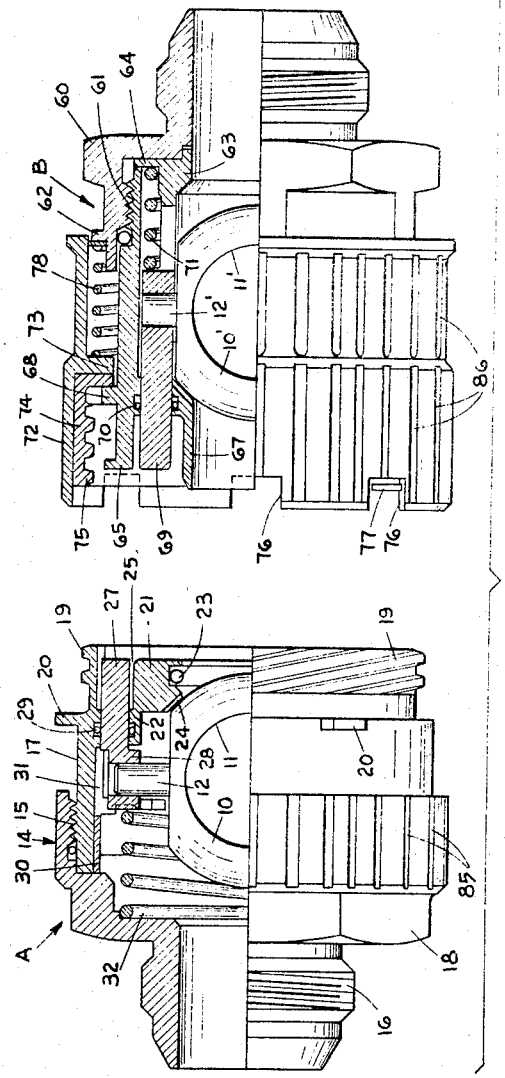
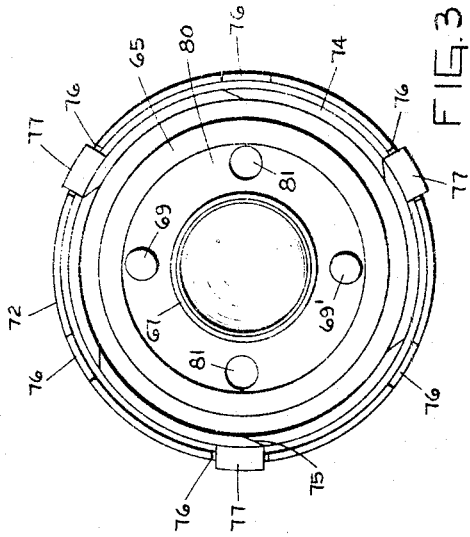
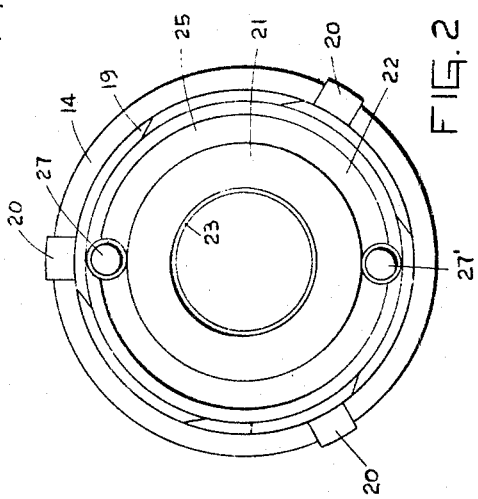
INVENTOR.
VINCENT A. GILL
BY
*Harry G. Shapiro*
ATTORNEY Oct. 4, 1966  V. A. GILL  3,276,474
VALVED COUPLING
Filed June 5, 1963  4 Sheets-Sheet 2
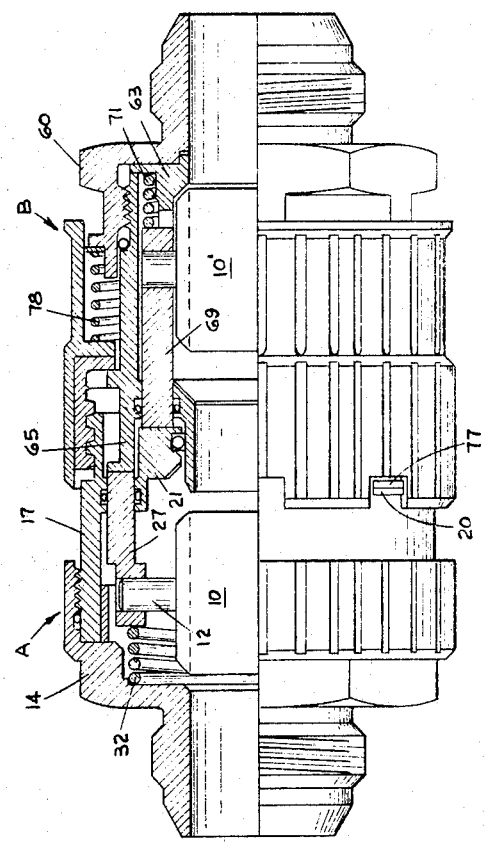
INVENTOR.
VINCENT A. GILL
BY
Harry G. Shapiro
ATTORNEY Oct. 4, 1966 V. A. GILL 3,276,474
VALVED COUPLING Filed June 5, 1963 4 Sheets-Sheet 3

INVENTOR.
VINCENT A. GILL
BY
Harry G. Shapiro
ATTORNEY

Oct. 4, 1966  V. A. GILL  3,276,474
VALVED COUPLING

Filed June 5, 1963  4 Sheets-Sheet 4

INVENTOR.
VINCENT A. GILL
BY
Harry I. Shapiro
ATTORNEY

United States Patent Office 3,276,474
Patented Oct. 4, 1966

3,276,474
VALVED COUPLING
Vincent A. Gill, Montclair, N.J., assignor to General Pneumatic Corporation, Newark, N.J., a corporation of New Jersey
Filed June 5, 1963, Ser. No. 285,720
18 Claims. (Cl. 137—614.03)

The invention relates to a valved coupling, and more particularly to improvements in couplings of the type comprising complementary coupling members each incorporating a valve automatically actuated from closed to open position when the coupling members are joined together.

Couplings of this class are inserted into pipe lines carrying fluid under pressure. When the coupling members are separated, the associated valves are closed, thereby to prevent the escape of fluid from the line in which the couplings are inserted. When the coupling members are joined together, the valves are transferred, automatically, to the open position thereby affording free flow of the fluid therethrough. Preferably, the valves are of the ball type provided with an axial bore having a diameter corresponding to that of the particular pipeline to provide no obstruction to the flow of the fluid through the coupling when the valves are in the open position.

An object of this invention is the provision of a quick disconnect valved coupling of improved construction and facility in use.

An object of this invention is the provision of a quick disconnect valved coupling which does not require a swivel joint between the coupling members and the pipeline to effect a proper joining together of members.

An object of this invention is the provision of a connector of the class described comprising complementary coupling members at least one of which contains a ball valve and a mechanism for effecting opening and closing of the valve in a novel and improved manner upon joining and separating the coupling members.

An object of this invention is the provision of a quick disconnect valved coupling comprising a pair of coupling members each carrying a valve actuatable from closed to open positions as the members are connected together and wherein the mechanism for actuating the valves also serves to lock the valves in the open and closed positions.

An object of this invention is the provision of a novel mechanism for effecting translatory and rotary movement of a pivoted body.

An object of this invention is the provision of a novel mechanism for effecting first a translatory, then translatory and rotary movements and finally translatory movement to a pivotally-mounted body in response to a linear force applied in a direction normal to a pivotal axis of the body, said novel mechanism being particularly advantageous for quick disconnect valved couplings as will subsequently be explained.

These, and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings illustrating a preferred embodiment of the invention:

FIG. 1 is a side view of coupling members made in accordance with this invention, the members being disconnected and the valves in closed position and the upper portions of the members being shown in longitudinal cross-section;

FIG. 2 is an end view of the plug member shown on the left in FIG. 1;

FIG. 3 is an end view of the socket member shown on the right in FIG. 1;

FIG. 4 is similar to FIG. 1 but showing the plug and socket members connected together and the valves in open position;

FIG. 8 is a top view of the assembly shown in FIG. 6;

FIG. 9 is a top view of the assembly shown in FIG. 7; and

Figure 6:
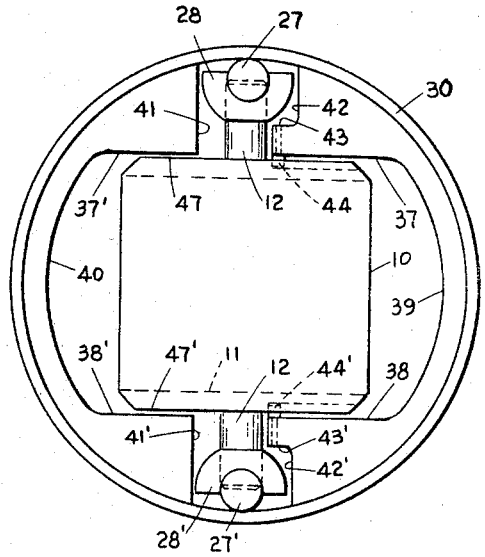
FIG. 6 is an enlarged end view showing the components of FIG. 5 in assembled relationship and the valve in the closed position.

Referring to the drawings, and particularly to FIG. 1, a quick disconnect valved coupling made in accordance with this invention comprises a plug member A and a complementary socket member B, each having an axial passageway extending therethrough and including conventional means for insertion thereof in a flexible hose or pipeline. Each coupling member is provided with identical ball valves 10, 10' which may be in the form of a spherical ball, or cylinder, provided with a bore or through hole 11, 11', respectively, having a diameter substantially equal to the internal diameter of the pipe or hose to which the coupling members are connected. Although it is within the scope of the invention to provide only one of the coupling members with a valve, the invention is illustrated with respect to a pair of coupling members, each of which is provided with a valve and associated actuating means. Each valve is provided with diametrically-opposed shafts for rotation about an axis normal to longitudinal axis of the coupling, the upper such shafts 12, 12' being visible in FIG. 1. The coupling members are so constructed that when disconnected, as shown in FIG. 1, the valves are closed thereby preventing the escape of fluid from the pipelines. When the valve coupling members are connected together, as shown in FIG. 4, the valves are in open position thereby providing a straight-through passageway for the flow of fluid through the coupling.

Referring to FIGS. 1 and 2, the plug member A comprises a hollow body or casing 14 provided with an internal thread portion 15 and a reduced-diameter nipple portion 16 for insertion into the pipeline. The plug housing is completed by a tubular casing 17 provided with an externally-threaded portion for mating with the threaded portion 15 of the base 14. In the assembly of the plug member A, the base 14 and casing 17 are tightly threaded together, the base being provided with a hexagonal portion 18 to facilitate such assembly.

The casing 17 is a unitary member and includes an external, multiple start thread portion 19, three radially-extending splines 20, and an axially extending boss 21 joined to the casing by a cylindrical web portion 22. A sealing ring 23 is positioned within a circumferential groove formed on the inner diameter of the boss 21. Further, the boss 21 has cemented thereto a resilient seating ring 24 against which the ball valve 10 is pressed when the valve is in the closed position, as shown. It is here pointed out that the boss 21 is spaced from the contiguous wall of the casing by a circular groove 25.

The bearing members for the shafts of the ball valve 10 comprise individual plungers. The upper plunger, visible in FIG. 1, comprises a cylindrical shank portion 27 extending through a longitudinal hole, formed in the web portion 22 of the casing, and into the clearance area provided by the circular groove 25. The rear portion 28 of the plunger is of generally rectangular shape and provided with a hole which accommodates the upper shaft 12. A sealing ring 29 of suitable material serves as a seal to prevent leakage past the plunger. The lower plunger 27' is of identical construction and the forward circular end thereof is visible in FIG. 2. Disposed within the housing is a metal supporting ring 30, provided with diametrically opposite longitudinal slots 31 and 31' in the regions of the inner portions of the two plungers, and a compression spring 32. The function of the supporting ring will be described hereinbelow with specific reference to FIGS. 5–7. It will be clear that when the plug casing 17 is threaded to the base 14, the compression spring 32 urges the plungers to the right, as viewed in FIG. 1, thereby causing the ball valve 10 to seat tightly against the resilient ring 24 to completely close the opening in the casing 17. When the two plungers are forced to the left, the ball valve is first moved away from the resilient ring 24 and then rotated 90 degrees to the open position, as will be explained hereinbelow with the specific reference to FIGS. 10–13.

Figure 5:
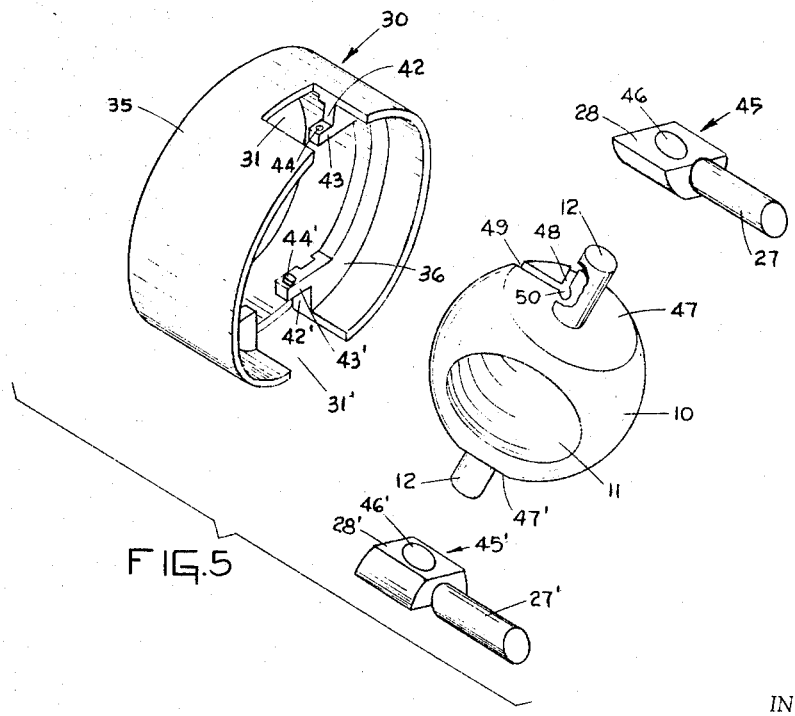
FIG. 5 is an exploded isometric view showing the components forming the valve-actuating mechanism.

Referring to FIG. 5, the supporting ring 30 comprises a cylindrical wall portion 35 and a radial, inwardly-directed flange portion 36. As best seen in FIG. 6, the opening formed in the said flange portion is generally defined by the horizontal, parallel lines 37, 37', 38, 38' and the arcuate lines 39 and 40, such opening providing a clearance hole for the ball valve 10. It will be noted that opposed slots also are formed in the flange portion 36, the upper slot being defined by the straight wall 41 (FIG. 6) and the offset wall 42 and the lower slot being defined by the similar walls 41' and 42'. These slots provide a clearance area for the respective shafts 12 of the ball valve 10 and the inner portions 28, 28' of the plungers. The offset slot walls 42 and 42' result in the formation of the respective ledge portions 43 and 43'. Force-fitted into appropriate holes formed in the ledge portions are the steel pins 44, 44', said pins having elongated, generally oblong heads which extend into the path of travel of the ball valve.

Referring again to FIG. 5, the upper and lower plungers are here designated by the numerals 45 and 45', respectively. The rear portion of each plunger is provided with a hole 46, 46' for receiving the respective shafts 12 of the ball valve 10 with a minimum of play. The ball valve is truncated by spaced, parallel planes normal to the shaft axis thereby forming flat top and bottom surfaces 47, 47'. A Y-shaped channel is formed in the upper surface 47, such channel comprising the grooves 48 and 49 which, in the illustrated embodiment, diverge at an angle of 90 degrees, such grooves terminating in a radial groove 50. A precisely corresponding channel is formed in the lower flat surface of the ball valve. The oblong heads of the pins 44 and 44' carried by the supporting ring 30 are adapted for sliding movement within such channels when the ball valve is assembled in operative relationship to the supporting ring.

To assemble the components shown in FIG. 5, the two plungers 45 and 45' are first assembled onto the ball valve with the shafts 12 passing through the respective holes 46 and 46'. The valve, carrying the plungers, is then slidably inserted into the supporting ring 30, with the protruding head of the upper pin 44 sliding along the channel groove 48 and the lower pin 44' sliding along the corresponding channel groove formed in the lower flat surface of the valve. The enlarged, rear portions 28, 28' of the plungers are positioned to slide within the slots generally defined by the numerals 31 and 31' formed in the supporting ring 30. The actual spacing between the plungers and the ledges 43, 43' formed in the supporting ring is determined by guide holes formed in the web 22, FIG. 1 showing wherein the cylindrical end 27 of the upper plunger passes through such guide hole and extends into the groove 25. Further, the slots 31, 31' in the supporting ring 30 and the radial flange 36 are such as to permit a predetermined movement of the plungers parallel to the axis of the supporting ring, and since the shafts of the ball valve are positioned within the plunger holes 46, 46', such movement of the plungers results in a corresponding movement of the ball valve. This movement of the ball valve causes the pins 44, 44' to slide within the respective upper and lower channels formed in the flat surfaces of the valves, as will be described in detail hereinbelow with specific reference to FIGS. 10–13.

Figure 7:
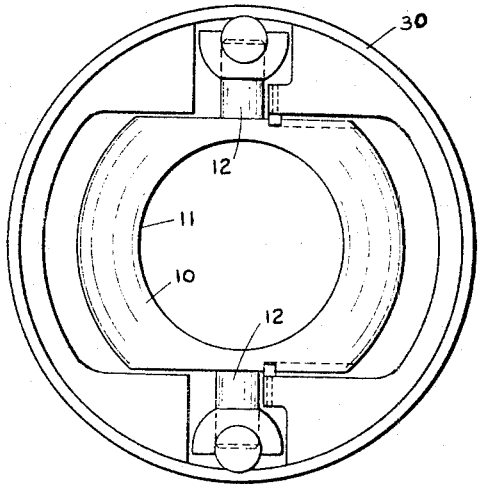
FIG. 7 is similar to FIG. 6 but showing the valve in the open position.

It will be apparent that when the parts shown in FIG. 5 are assembled, as described, the end view of the assembly is as shown in FIG. 6, that is, the central opening 11, extending through the valve, has its axis normal to that of the supporting ring. This is the closed position of the valve as shown in FIG. 1. On the other hand, when the ball valve 10 is rotated 90 degrees, as shown in FIG. 7, the axis of the valve opening coincides with that of the supporting ring. This is the open position, as shown in FIG. 4.

FIGS. 8 and 9 are top views of the assembly shown respectively in FIGS. 6 and 7, FIGS. 10 through 13 illustrating the action of opening and closing and vice versa in greater detail. In the closed position of the valve, as shown in FIG. 8, the elongated head of the upper pin 44 carried by the supporting ring 30 is disposed in the groove 49 prior to movement of the plunger 27. As has already been described with reference to FIG. 1 to which reference again is made, the compression spring 32 abuts against the two plungers and is compressively retained within the plug connector member A. Thus, the plungers are spring-biased to the right whereby the ball valve 10 abuts firmly against the resilient ring 24 carried by the casing 17. The supporting ring 30 is clamped in fixed position between the base 14 and the web portion 22 of the casing 17. Depression of the two plungers 27 and 27' (see FIG. 2) results first in a linear or axial movement spacing the valve from the resilient ring 24, then a combined axial and rotary movement, and finally an axial movement as will now be described.

Figure 10:
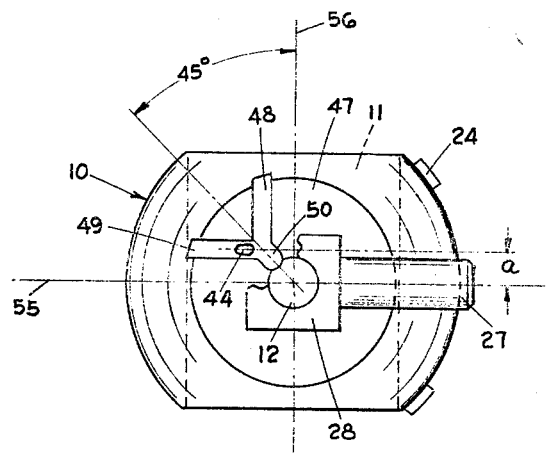
FIGS. 10–13 are diagrammatic representations illustrating the operation of the valve-actuating mechanism.

Reference now is made to the diagrammatic representation of FIGS. 10–13 wherein parts unnecessary to an understanding of the valve-actuating mechanism have been omitted. FIG. 10 shows the valve 10 in the closed position. In this position, the valve is pressed firmly against the resilient ring 24 and the elongated guide pin 44 is positioned within the groove 49 of the Y-shaped channel formed in the upper flat surface of the valve 10. It must be borne in mind that the pin 44 remains in fixed position at all times and that the plunger can only move along the center line identified by the numeral 55. In consequence, the distance $a$ between the pin and such center line remains constant at all times. For purposes of reference, the vertical center line is identified by the numeral 56 in FIG. 10.

Figure 11:
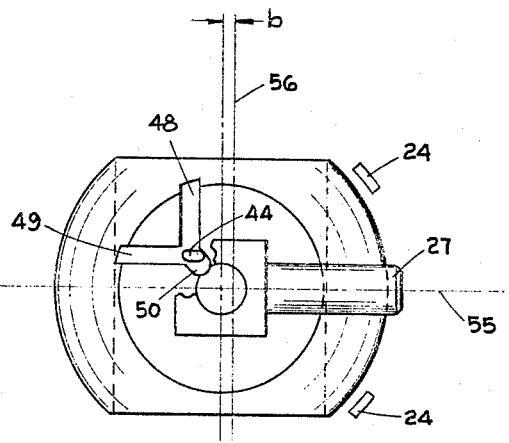
Figure 12:
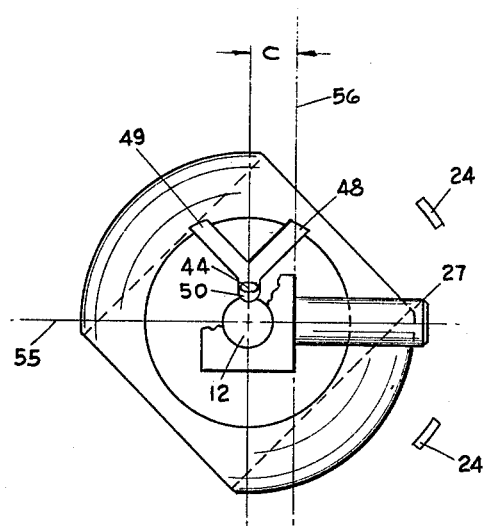
Figure 13:
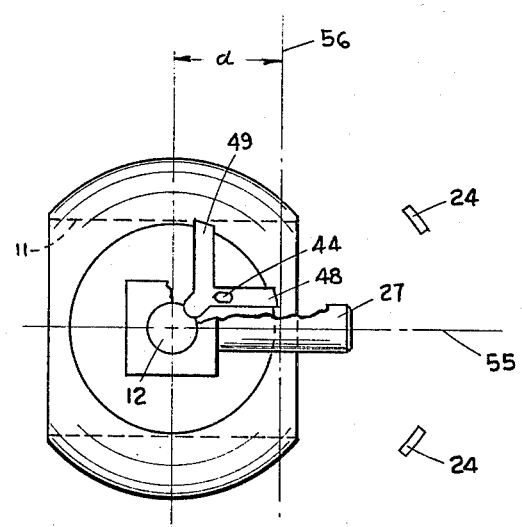

When the plunger 27 is moved to the left, it forces the ball valve 10 to move an equal distance $b$ to the left. As the valve moves to the left pin 44 comes into contact with the intersection of the right-hand sides of grooves 48 and 50 (FIG. 11). Since the force where the pin engages the wall of the channel is off-center with respect to the axis of the shaft 12, a torque is generated which rotates the valve clockwise as will be evident from a comparison of FIGS. 11 and 12. The shaft's axis is displaced a distance $c$ from the initial axis 56. As motion of the plunger to the left continues, the torque further rotates the valve, the pin 44 entering and then exiting from the groove 50 (FIG. 12), until 90° of rotation is accomplished (FIG. 13). At this point, the pin 44 has entered groove 48, and the valve is now spaced a distance $d$ from the initial axis 56. Further plunger movement to the left increases the extent of movement of pin 44 in the groove 48, affording over-travel to the left without further rotation.

It will be apparent that the Y-shaped channel and cooperating pin arrangement furnishes a sequence of movement as follows: First, the valve is displaced axially so that it is unseated and unlocked from its closed position. Then, the valve has imparted thereto a combination of axial and rotational movements wherein the continued axial movement of the unseated valve is converted to rotation of the valve to open position. Finally, axial movement is imparted to the open valve, and such movement is accompanied by locking of the valve in open position with the advantage of permissible over-travel. The reverse sequence, with the valve rotated counter-clockwise to closed position, takes place when the valve is closed and the members uncoupled. In closing, the axial movement at the end of the sequence results in locking of the valve in closed position, the permissible over-travel at the end of the sequence affording the advantage of reduced tolerances.

In view of the foregoing, it will be apparent that rotation of the valve is not effected by friction between the valve and the resilient washer 24. The initial linear or axial movement reduces wear and damage to the washer, allowing the washer to be made of a great number of materials without regard to their frictional properties. This initial axial movement, coupled with the permissible use of highly resilient materials for the washer 24, also allows a comparatively rough finish in all surface areas of the valve except the area of engagement of the valve and the washer, where a smooth, polished finish is desired. In fact, the area of the valve which engages the washer may be conical, since seating and unseating is accompanied by axial motion only.

The grooves 48 and 49 extend to the circular edge of the flat surface of the valve. This permits assembly of the valve to the supporting ring, as will be clear from a study of FIGS. 6 and 7. Further, and importantly, the somewhat longer than necessary grooves allow for over-travel in both the closed and open positions of the valve. Referring specifically to the open position shown in FIG. 13, it will be apparent that a further movement of the plunger to the left is permissible and that such further movement does not impart further rotation of the valve. This arrangement eliminates the need for a critical adjustment of the plunger travel as is the case in prior constructions of valves of this class. Also, when the valve is in the open position, the pin lies wholly within the groove 48 thereby effectively locking the valve in this position which is important in this type of coupling since a low pressure drop can only be achieved if the flow passages are carefully aligned. In a like manner, when the valve is in the closed position, as shown in FIG. 10, the permitted over-travel of the pin in the groove 49 eliminates the requirement for a critical relationship between the valve and the resilient ring 24 and automatically compensates for wear and compression of the ring. More importantly, with the pin aligned in the groove 49, the valve is more or less floating that is, there are no gears, linkages, levers, etc., which might bind or otherwise interfere with the biasing action of the compression spring. This promotes a positive closure of the valve when the two coupling members are disconnected from each other.

Depression of the plungers to rotate the associated valve from the open to the closed position is brought about automatically when the plug and socket membes A and B are coupled together. As shown in FIGS. 1-4, each coupling member includes a generally cylindrical boss which butts against the plungers of the opposite coupling member. The boss 21 provides a cirumferentially continuous surface on the same diameter as a pair of plungers 69, 69' on the socket member and a boss 65 on the socket member provides a circumferentially continuous surface on the same diameter as the plungers 27, 27' on the plug member. Thus, pressing the plug and socket members together in an axial direction is all that is required to produce depression or actuation of the plungers; predetermined angular orientation of the coupling members to initiate connection of the members is obviated.

The socket member B, as shown in FIGS. 1 and 3, comprises a base 60 having an internal thread 61 and a circular flange 62. Positioned within the base 60 is a supporting ring 63 having a circular flange 64, the ring being secured in fixed position by the cylindrical member 65 whose inner end surface clamps the flange 64 to the base 60 when the cylindrical member is tightly threaded to the base as shown. The cylindrical member 65 includes an integral web portion terminating in a tubular portion 67, which has a beveled forward end and a radially-extending flange portion 68. A pair of holes are formed in the web portion of the cylindrical member 65 for receiving the cylindrical forward ends of two plungers 69, 69', leakage between each plunger and the wall defining the corresponding hole being prevented by suitable O rings 70. These plungers generally are similar to the plungers carried by the plug member A, each having an enlarged rear portion provided with a hole for receiving the shafts 12', 12' of the ball valve 10'. Such ball valve is identical to the valve 10, that is, the valve has flat top and bottom surfaces with a Y channel formed in each flat surface. Also, the supporting ring 63 extends longitudinally to a plane lying to the left of the shafts 12' and is provided with slots accommodating the respective rear portions of the plungers. The supporting ring 63 possesses essentially the same structure as the ring 30 in the plug member in that it is provided with diametrically opposite pins for cooperation with Y-shaped channels formed in the flat surfaces on opposite sides of the ball valve 10'. The plungers 69, 69' are biased to the left by the compression spring 71. It will be noted that the plungers of the socket member B lie on a radius smaller than that of the plungers of the plug member A and that the forward flat surface of the cylindrical member 65 will engage the plug member plungers, while the boss 21 of the plug member will engage the plungers of the socket member, when the plug and socket members are connected together.

For purposes of coupling the plug and socket members together, the latter includes an outer shell 72 having an inwardly-directed cylindrical flange portion 73. Fitted into the shell 73 is an insert 74 having an internal multiple start thread 75 adapted for mating with the external thread portion 19 formed in the wall of the plug casing 17. The left end of the shell 72 is provided with six peripheral slots 76, whereas the insert 75 includes three integral, outwardly-directed splines 77 extending into alternate slots of the shell. This arrangement prevents relative rotation between the shell 72 and the thread-carrying insert 74. A compression spring 78 is confined within the shell 72 with the spring ends abutting the inwardly-directed flange 73 of the shell and the outwardly-directed flange 62 of the base 60. The construction is such that the shell 72 normally is rotatable relative to the other assembled components of the socket member and is subject to a limited longitudinal movement against the biasing force of the spring 78. All of the socket member components are held in assembled relationship by the cylindrical member 65, the forward surface of the web portion 80, see FIG. 3, being provided with longitudinal bores 81 for receiving a suitable tool by means of which the member 65 can be tightly threaded to the base 60.

Attention is directed to the three radially-extending splines 20 formed integral with the casing 17 of the plug member A. These three splines are adapted to pass into appropriate slots 76 formed in the shell 72 of the socket member A. Also, the outer surface of the base 14 of the plug member is provided with a plurality of flutes 85 and the outer surface of the shell 72 of the socket member is provided with flutes 86, such flutes providing good hand-gripping surfaces for connecting together the plug and socket members.

The coupling together of the plug and socket members is begun by bringing them into axial alignment, as shown in FIG. 1, and advancing the members toward each other until positive contact is made. At this point, the beveled end of the socket tubular portion 67 enters into the resilient ring 23 of the plug member, the forward ends of the plug member plungers 27, 27' engage the circular face of the cylindrical member 65 (of the socket member B) and the forward ends of the socket plungers 69, 69' engage the face of the boss 21 (of the plug member). A slight rotation of the socket shell 72 brings about a mating of the multiple start threads 19 and 75, and continued rotation of the shell causes the plug and socket members to be drawn together until the leading edge of the shell 72 abuts against the radial splines 20 of the plug. At this point, the plug splines are not in alignment with the appropriate, longitudinal slots 76 formed in the shell edge. Rotation of the shell may continue because of its spring mounting (the spring 78) thereby allowing the internal components of the socket member to be drawn into final position with respect to the plug member. In such final position, a corresponding number of the shell's slots 76 are in circumferential registration or alignment with the splines 20, whereupon the shell snaps toward the plug with the splines entering the slots. This locks the plug and socket members together, since both members can only rotate as a unit as long as the splines of the plug are disposed in the slots of the socket shell. Such positioning of the splines in the slots is visible evidence that the plug and socket are fully coupled together. In order to uncouple the plug and socket, the shell 72 is pulled back against its biasing spring 78, thereby disengaging the splines from the shell whereupon the shell can be rotated in the reverse direction.

During the described coupling together of the plug and socket, the plungers of both the plug and the socket are depressed thereby simultaneously effecting the translatory and rotary movement of the two ball valves from the closed positions shown in FIG. 1 to the open positions shown in FIG. 3. The coupling and uncoupling of the plug and socket members is accomplished by rotation of the socket shell and the actuation of the plungers does not require a precise predetermined alignment of the plug and socket members prior to the coupling operation. These features eliminate the requirement for a swivel joint between one or both coupling members and the pipeline connected thereto. Further, this construction permits the use of multiple start threads thereby facilitating the coupling and uncoupling operations. The described valve-actuating mechanism is simple and positive in operation.

Having now given a detailed description of the invention, those skilled in this art will find no difficulty in making various changes and modifications in the illustrated construction, without departing from the scope and spirit of the invention as recited in the following claims.

I claim:

1. A valved coupling of the class comprising plug and socket members, each having an axial passageway extending therethrough, a valve positioned in at least one of the members, and actuating means positioning the valve in closed position when the plug and socket members are disconnected and in open position when the plug and socket members are connected together, said actuating means including means for displacing the valve in the sequence of axial movement wherein the valve is first unseated and unlocked from its closed position, followed by axial and rotational movement wherein continued axial movement of the open valve is accompanied by locking in of the valve to open position, and wherein continued axial movement of the open valve is accompanied by locking in open position, the reverse sequence taking place in closing the valve and uncoupling the members.

2. In a valved coupling of the class comprising plug and socket members each having an axial passageway extending therethrough, a pivotally mounted valve carried by at least one of the members, and actuating means positioning the valve in closed position when the plug and socket members are disconnected and in open position when the plug and socket members are connected together, improved actuating means comprising a set of plungers carried by the member containing the valve, said plungers being movable longitudinally of the member and connected to the associated valve to displace the pivotal axis of the valve in correspondence with the displacement of the plungers, means provided by the plug and socket members for displacing the plungers irrespective of the relative angular orientation of the plug and socket members as the plug and socket members are coupled together, the valve being rotated to open position upon displacement of the plungers.

3. In a quick disconnected valved coupling of the class comprising plug and socket members each having an axial passageway extending therethrough, pivotally mounted valves carried by the members, and actuating means positioning the valves in closed position when the plug and socket members are disconnected and in open position when the plug and socket members are connected together, improved actuating means comprising a set of plungers carried by the plug member and movable longitudinally thereof, said plungers being connected to the associated valve to displace the pivotal axis of the valve in correspondence with the displacement of the plungers, a second set of plungers carried by the socket member and movable longitudinally thereof, said plungers being connected to the associated valve to displace the pivotal axis of the valve in correspondence with the displacement of the plungers, means provided by the plug and socket members for displacing the plungers irrespective of the relative angular orientation of the plug and socket members as the plug and socket members are coupled together, and for rotating each valve being rotated to open position upon displacement of the plungers.

4. In a quick disconnect valved coupling as set forth in claim 3, wherein the said means for displacing the plungers comprises a cylindrical boss carried by the plug member which abuts the plungers of the socket member and a cylindrical boss carried by the socket member which abuts plungers of the plug member.

5. A quick disconnect valved coupling comprising plug and socket members each having an axial passageway extending therethrough, said members provided with complementary mating threads for connecting them together in axial alignment, pivotally mounted valves carried by the plug and socket members, means positioning the valves in closed position when the plug and socket members are disconnected, a first set of plungers mounted for predetermined longitudinal displacement in the plug member connected to the associated valve, a second set of plungers mounted for predetermined longitudinal displacement in the socket member and connected to the associated valve, means simultaneously displacing both sets of plungers when the plug and socket members are connected together, and means effective upon displacement of the plungers to impart movement to the valves in the sequence of translatory, translatory and rotary, and translatory movement in the opening of the valves.

6. A quick disconnect valved coupling as set forth in claim 5, wherein the said means displacing the plungers comprises a first cylindrical boss carried by the plug member for abutting the plungers of the socket member and a second cylindrical boss carried by the socket member for abutting the plungers of the plug member.

7. A quick disconnect valved coupling as set forth in claim 6, wherein the outside diameter of the said surface of the first boss is less than the inside diameter of the said surface of the second boss.

8. A quick disconnect valved coupling as set forth in claim 5, including means preventing rotary displacement of the valves when the associated plungers are positioned at the limits of their longitudinal displacement.

9. A quick disconnect valved coupling as set forth in claim 5, wherein the mating threads of the socket member are carried by a shell member which is rotatably connected to the socket member.

10. A quick disconnect valved coupling as set forth in claim 9, wherein an end of said shell member is provided with spaced longitudinal slots and the plug member carries radially-extending, spaced splines which are positionable within the said slots when the plug and socket members are connected together.

11. A quick disconnect valved coupling comprising a plug member and a socket member each having an axial passageway extending therethrough, said members provided with complementary mating threads for connecting them together in axial alignment, a first valve carried by the plug member, a first cylindrical boss carried by the plug member having a flat end surface lying in a plane normal to the axial passageway and proximate to that end of the plug member provided with the mating means, a first set of plungers connected to the said valve and mounted for axial movement between a first position wherein the ends of the plungers lie substantially in the plane of the flat surface of the said cylindrical boss and a second position wherein said ends are recessed from the said plane, said plungers having axes spaced from the said flat surface, spring means normally biasing the first set of plungers to the first position, means positioning the said valve to close and open the axial passageway when the first set of plungers are in the first and second positions, respectively, a second valve carried by the socket member, a second cylindrical boss carried by the socket member and having a flat end surface lying in a plane normal to the axial passageway and proximate to that end of the socket member provided with the mating means, a second set of plungers connected to the second valve and mounted for axial movement between a first position wherein the ends of the plungers lie substantially in the plane of the flat surface of the second cylindrical boss and a second position wherein said ends are recessed from the said plane, said plungers having axes spaced from the said flat surface, spring means normally biasing the second set of plungers to the first position, and means positioning the second valve to close and open the axial passageway when the associated plungers are in the first and second positions, respectively, the flat surface of the second cylindrical boss abutting the ends of the first set of plungers and the flat surface of the first cylindrical boss abutting the ends of the second set of plungers when the plug and socket members are connected, whereby both sets of plungers are moved to their respective second positions.

12. A quick disconnect valved coupling as set forth in claim 11, wherein the valves are ball type valves each provided with diametrically-opposed shafts having aligned axes normal to the axial passageway, the shafts of the first valve being journaled for rotation within holes formed in the first set of plungers, and the shafts of the second valve being journaled for rotation within holes formed in the second set of plungers.

13. A quick disconnect valved coupling as set forth in claim 11, wherein the means positioning the valves to close and open the axial passageway comprises opposed flat surfaces formed on each valve and normal to the valve shaft axes, matching Y-shaped channels formed in the opposed flat surfaces of each valve, the base of the Y being formed by a first groove having an axis intersecting that of the associated shafts and the arms of the Y forming two grooves diverging at an angle of approximately 90 degrees, a first pair of spaced, fixed pins carried by the plug member, said pins having ends projecting into the Y-shaped channels formed in the first valve at points laterally spaced from the associated shafts, and a second pair of spaced, fixed pins carried by the socket member, said pins having ends projecting into the Y-shaped channels formed in the second valve at points laterally spaced from the associated shafts.

14. A quick disconnect valved coupling as set forth in claim 13, wherein the heads of the said pins are elongated and have their major axes parallel to the longitudinal axis of the passageway.

15. A quick disconnect valved coupling as set forth in claim 11, including a shell member rotatably carried by the socket member, said shell being provided with the mating threads for securing the plug and socket members together, second spring means normally biasing the shell member in a forward direction, and stop means carried by the socket member and limiting the forward movement of the shell member to a point wherein the end of the shell member lies in a plane forward of the flat surface of the said second cylindrical boss.

16. A quick disconnect valved coupling as set forth in claim 15, wherein the plug member includes a plurality of spaced, outwardly-extending splines, the mating means of the plug member is formed between said splines and the end of the plug member, the end of the shell member is provided with longitudinal slots spaced to correspond to the spacing of said splines, and the mating threads carried by the shell member are recessed relative to the said end of the shell member, the arrangement being such that as the plug and socket members are threadedly connected together, the said end of the shell member first bears against the said splines, then is displaced axially of the socket member against the opposing force of said second spring, and then springs forwardly when the said splines are aligned with the said slots.

17. A device for impairing a predetermined translatory and angular movement to a body having a flat surface formed thereon, which body has a rotational axis defined by a shaft member extending from said flat surface, said device comprising a plunger having a hole receiving said shaft member, means mounting the plunger for translatory movement in a plane containing the rotational axis of the body, a Y-shaped channel formed in said flat surface, the grooves of the arms in the Y intersecting at a point spaced from said rotational axis and diverging at an angle corresponding to the predetermined angular movement to be imparted to the body, and a fixed guide pin having its end disposed in said channel.

18. A device for imparting a predetermined angular rotation to a body in response to a pretermined translatory movement of the body, said body having opposed flat surfaces formed thereon with aligned shaft members extending therefrom, said device comprising a pair of plungers disposed on opposite sides of the body, each plunger provided with a hole receiving an associated shaft member, means mounting the plungers for translatory movement in a plane containing the rotational axis of the body, a Y-shaped channel formed in a flat surface of the body, the base of the Y-shaped channel being a radial groove having an axis intersecting the said rotational axis, the arms of the channel being grooves which diverge at the predetermined angle, a fixed supporting frame member encircling the body and spaced therefrom, and a pin carried by the frame member having its end extending into said Y-shaped channel, the pin end lying in one or the other of the diverging grooves when the plungers are positioned at one or the other limit of their translatory movement.

References Cited by the Examiner

UNITED STATES PATENTS

| 187,982 | 3/1877 | Pirsson et al. | 251—149.2 |
| 2,948,553 | 8/1960 | Gill et al. | 137—614.02 |
| 2,991,090 | 7/1961 | De Cenzo | 137—614.02 |

FOREIGN PATENTS 539,014  8/1941  Great Britain.

M. CARY NELSON, *Primary Examiner.*

HENRY T. KLINKSIEK, *Examiner.*